United States Patent [19]

Isensee et al.

[11] Patent Number: 5,734,805
[45] Date of Patent: Mar. 31, 1998

[54] APPARATUS AND METHOD FOR CONTROLLING NAVIGATION IN 3-D SPACE

[75] Inventors: Scott H. Isensee, Georgetown, Tex.; Parrish F. Hanna, Cincinnati, Ohio

[73] Assignee: International Business Machines Corporation, Armonk, N.Y.

[21] Appl. No.: 262,082

[22] Filed: Jun. 17, 1994

[51] Int. Cl.⁶ .................................................. G06T 3/00
[52] U.S. Cl. ........................ 395/119; 395/133; 395/174; 395/339; 395/973
[58] Field of Search .................... 395/119, 152, 395/155, 159, 161, 133, 137, 138, 174, 173, 334, 348, 349, 355, 357, 973, 974, 976; 345/145, 146, 157; 434/112, 118

[56] References Cited

U.S. PATENT DOCUMENTS

| | | | |
|---|---|---|---|
| Re. 32,632 | 3/1988 | Atkinson | 345/165 |
| Re. 32,633 | 3/1988 | Hovey et al. | 345/165 |
| 4,378,466 | 3/1983 | Esser | 345/22 |
| 4,766,423 | 8/1988 | Ono et al. | 345/159 |
| 4,788,538 | 11/1988 | Klein et al. | 395/118 |
| 4,789,855 | 12/1988 | Ozeki | 345/150 |
| 4,791,478 | 12/1988 | Tredwell et al. | 348/42 |
| 4,808,979 | 2/1989 | DeHoff et al. | 345/145 |
| 4,812,829 | 3/1989 | Ebina et al. | 345/159 |
| 4,835,528 | 5/1989 | Flinchbaugh | 345/159 |
| 4,839,838 | 6/1989 | LaBiche et al. | 364/709.11 |
| 4,858,149 | 8/1989 | Quarendon | 395/125 |
| 4,875,033 | 10/1989 | Kato et al. | 345/162 |
| 4,885,702 | 12/1989 | Ohba | 395/119 |
| 4,927,987 | 5/1990 | Kirchgessner | 200/5 R |
| 4,949,286 | 8/1990 | Ohba | 395/125 |
| 4,963,858 | 10/1990 | Chien | 345/157 |
| 4,987,527 | 1/1991 | Hamada et al. | 364/167.01 |
| 5,010,500 | 4/1991 | Makkuni et al. | 395/155 |
| 5,015,188 | 5/1991 | Pellosie, Jr. et al. | 434/38 |
| 5,019,809 | 5/1991 | Chen | 340/815.31 |
| 5,068,645 | 11/1991 | Drumm | 345/158 |
| 5,077,608 | 12/1991 | Dubner | 348/583 |
| 5,077,681 | 12/1991 | Miyazawa | 395/119 |
| 5,146,212 | 9/1992 | Venolia | 345/145 |
| 5,169,342 | 12/1992 | Steele et al. | 434/112 |
| 5,179,656 | 1/1993 | Lisle | 395/159 |
| 5,186,629 | 2/1993 | Rohen | 434/114 |
| 5,264,836 | 11/1993 | Rubin | 345/157 |
| 5,287,102 | 2/1994 | McKiel, Jr. | 340/825.19 |
| 5,303,388 | 4/1994 | Kreitman et al. | 395/159 |
| 5,384,580 | 1/1995 | Kadota | 345/145 |
| 5,418,549 | 5/1995 | Anderson et al. | 345/145 |
| 5,446,833 | 8/1995 | Miller et al. | 395/125 |

OTHER PUBLICATIONS

Chen et al., "A Study in Interactive 3-D Rotation Using 2-D Control Devces", ACM Computer Graphics, v22, n4, 8/88, pp. 121-129.

Young et al., The X Window System Programming & Applications with Xt, Prentice-Hall, Inc., 1992, pp. 95 and 99.

(List continued on next page.)

*Primary Examiner*—Mark K. Zimmerman
*Assistant Examiner*—Stephen Hong
*Attorney, Agent, or Firm*—A. P. Tennent; K. O. Hesse

[57] ABSTRACT

An apparatus and method for virtual navigation includes a control which controls the dimensional appearance of a first image on a display. The control comprises a second image associated with the first image and a mechanism for altering the appearance of the first image in response to selecting a portion of the second image. The second image is preferably displayed on a display and includes indicia for representing multiple modes of operation. The mechanism for altering the appearance of the first image is preferably a stored program. Alternatively, the mechanism may be implemented in electronic circuitry. An important element of control is the ability to combine indicia which represent different functions into a unitary control apparatus. Each combination of two or more indicia (e.g., direction, speed, incremental or continuous movement, etc.) results in a unique modular and multi-functional control.

17 Claims, 8 Drawing Sheets

OTHER PUBLICATIONS

Foley et al., *Computer Graphics Principles and Practice*, Second Edition, Addison–Wesley Publishing, 1990, pp. 398–401.

Masters Thesis, University of North Carolina at Charlotte, by Scott Isensee, Controls for Graphical User Interface: the M & M Rule, 1993.

An article published in the research disclosure, RO891–0583, "Depth/Force Capability for Mouse Pointing Devices", B. J. Cragun and H. R. Delp, Oct. 1992, No. 342, Kenneth Mason Publications, Ltd., England.

An article published in the Research Disclosure, RO891–0584, "Depth/Force Capability for Pointing Stick Devices", B. J. Cragun, Oct. 1992, No. 342, Kenneth Mason Publications, Ltd., England.

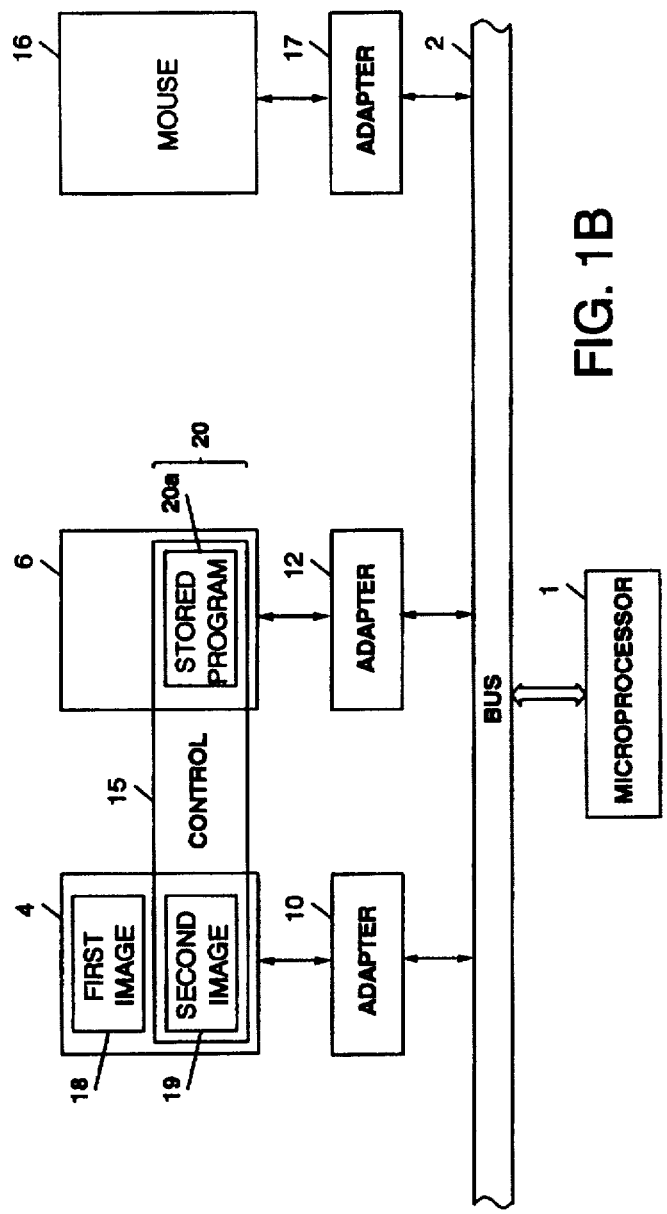
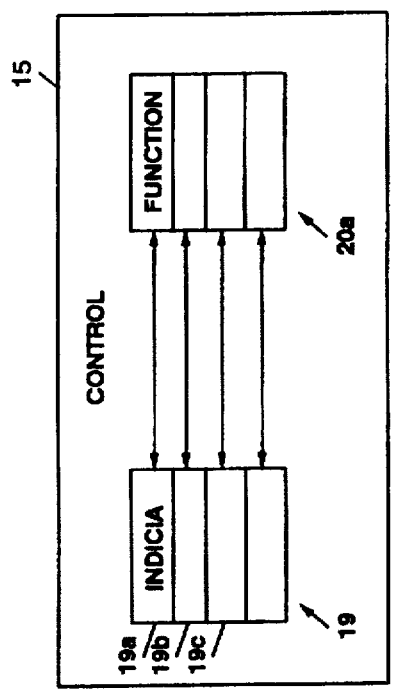

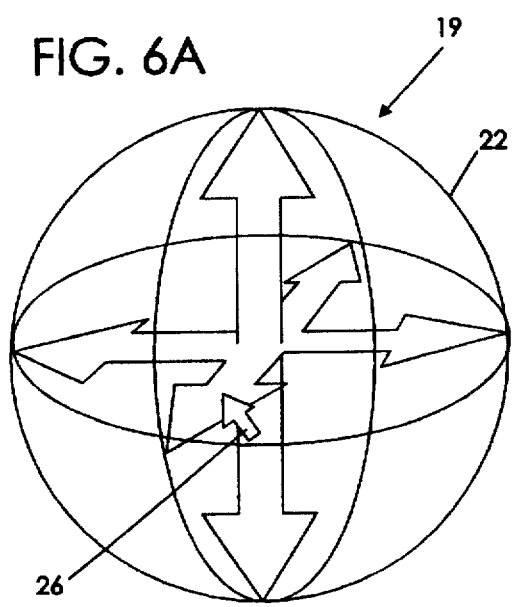
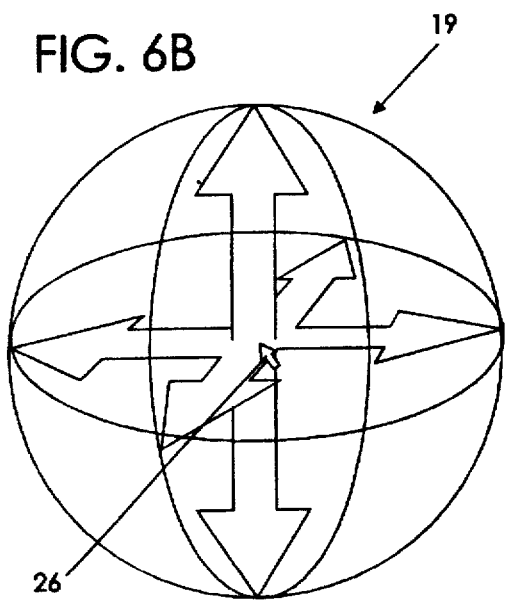
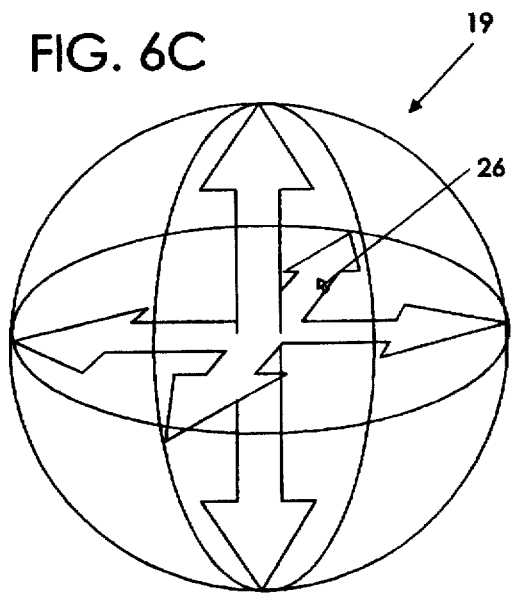
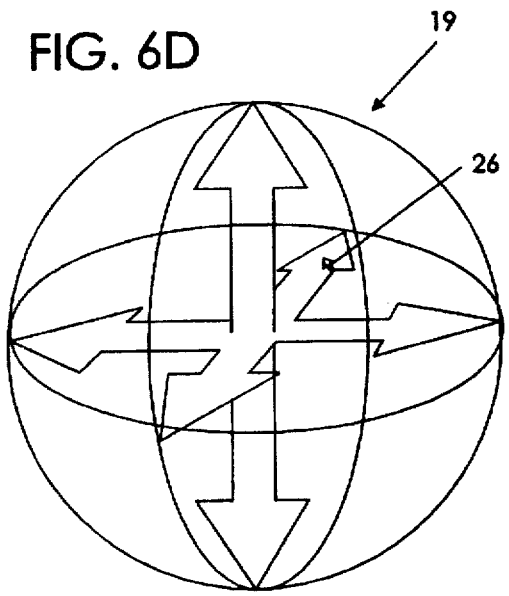

APPARATUS AND METHOD FOR CONTROLLING NAVIGATION IN 3-D SPACE

BACKGROUND OF THE INVENTION

1. Field of the Invention

The present invention relates to an apparatus and method for virtual navigation. More particularly, the present invention relates to an apparatus and method for controlling the dimensional appearance of an image on a display device.

Multimedia and virtual reality are important new application areas for computers. Navigational controls are required to allow computer users to move through dimensional spaces simulated by the computer (i.e., virtual navigation). As used herein, the term "dimension" includes, but is not limited to, spatial (e.g., length, breadth, thickness) and temporal extensions.

Potential areas of application for the present invention include computer assisted design and manufacturing (CADAM), graphical shells for operating systems such as the IBM® OS/2® Presentation Manager, multimedia programs, virtual reality programs, and video games.

2. Description of Related Art

Current techniques for navigating in virtual space typically require either specialized hardware or require the user to manipulate multiple controls at once.

A wide variety of hardware controls have been developed for three-dimensional (3D) input. One design is a joystick developed at the University of North Carolina at Chapel Hill. A two-dimensional (2D) joystick was mounted on a vertical shaft. Movement in the x and y axes are generated in the same manner as a typical 2D joystick while z axis movement is generated by raising and lowering the joystick on the shaft. Another design for 3D input is illustrated by the POWERGLOVE device from Mattel Inc. 3D movement of a user's hand inside the glove is translated by sonic sensors into 3D input for a computer.

One problem with such hardware input devices is that they are expensive. Another problem is that they are not standard equipment on computers. Few existing computers have such devices and most of them are currently available only as research tools, not as commercial products.

Software controls for multimedia and virtual reality programs often are modeled after the buttons on video tape recorders (VCRs). This provides for movement through the tape, but not through space. It limits the degree of interaction and control. It is appropriate only for multimedia applications which provide a serial display of video. Another approach is to use scroll bars or single arrows for direction and a slider for speed control. The problem here is that the user can't do two things at once. It is similar to driving a car without being able to use the steering wheel and accelerator at the same time. Software controls in use today typically just do one thing at a time. Existing software controls also typically rely on visual cues alone to provide feedback to the computer user.

The present invention overcomes these problems and disadvantages. Some of the concepts related to the present invention are discussed in "Controls for Graphical User Interfaces: the M & M Rule", by Scott H. Isensee, Thesis for Master of Computer Science degree at the University of North Carolina at Charlotte (1993), which is specifically incorporated herein by reference in its entirety.

SUMMARY OF THE INVENTION

An apparatus and method for virtual navigation includes a control apparatus which controls the dimensional appearance of a first image on a display. The control comprises a second image associated with the first image and a mechanism for altering the appearance of the first image in response to selecting a portion of the second image. The second image is preferably displayed on a display and includes indicia for representing multiple modes of operation. The mechanism for altering the appearance of the first image is preferably a stored program. Alternatively, the mechanism may be implemented in electronic circuitry. An important element of control is the ability to combine indicia which represent different functions into a unitary control apparatus. Each combination of two or more indicia (e.g., direction, speed, incremental or continuous movement, etc.) results in a unique modular and multi-functional control.

One advantage of the invented navigational control is that it provides a control which is modular and multi-functional, that is, one which is built up based on the functions available and which provides the ability to do multiple things at once.

Another advantage of the invented navigational control is that it provides increased function and improved ease of use.

Yet another advantage of the invented navigational control is that it helps users to cope with increasingly complex and high-function computer programs.

Another advantage of the invented navigational control is that it may provide auditory feedback as to position within a virtual environment.

The foregoing and other objects and advantages of the present invention will be apparent to those skilled in the art of information handling technology in view of the accompanying drawings, description of the invention, and appended claims.

BRIEF DESCRIPTION OF THE DRAWINGS

FIG. 1B is a block diagram of a portion of FIG. 1A which includes a depiction of the control apparatus of the present invention.

FIG. 1C is a block diagram of a portion of FIG. 1B which includes a depiction of the functional relationship between indicia of a second image and a stored program having multiple functions.

FIG. 6A, 6B, 6C, and 6D are views depicting an alternative embodiment of the visual component of the control apparatus, including indicia, in the form of a changing cursor, for representing position within a virtual environment.

DESCRIPTION OF THE PREFERRED EMBODIMENT

Figure 1A:
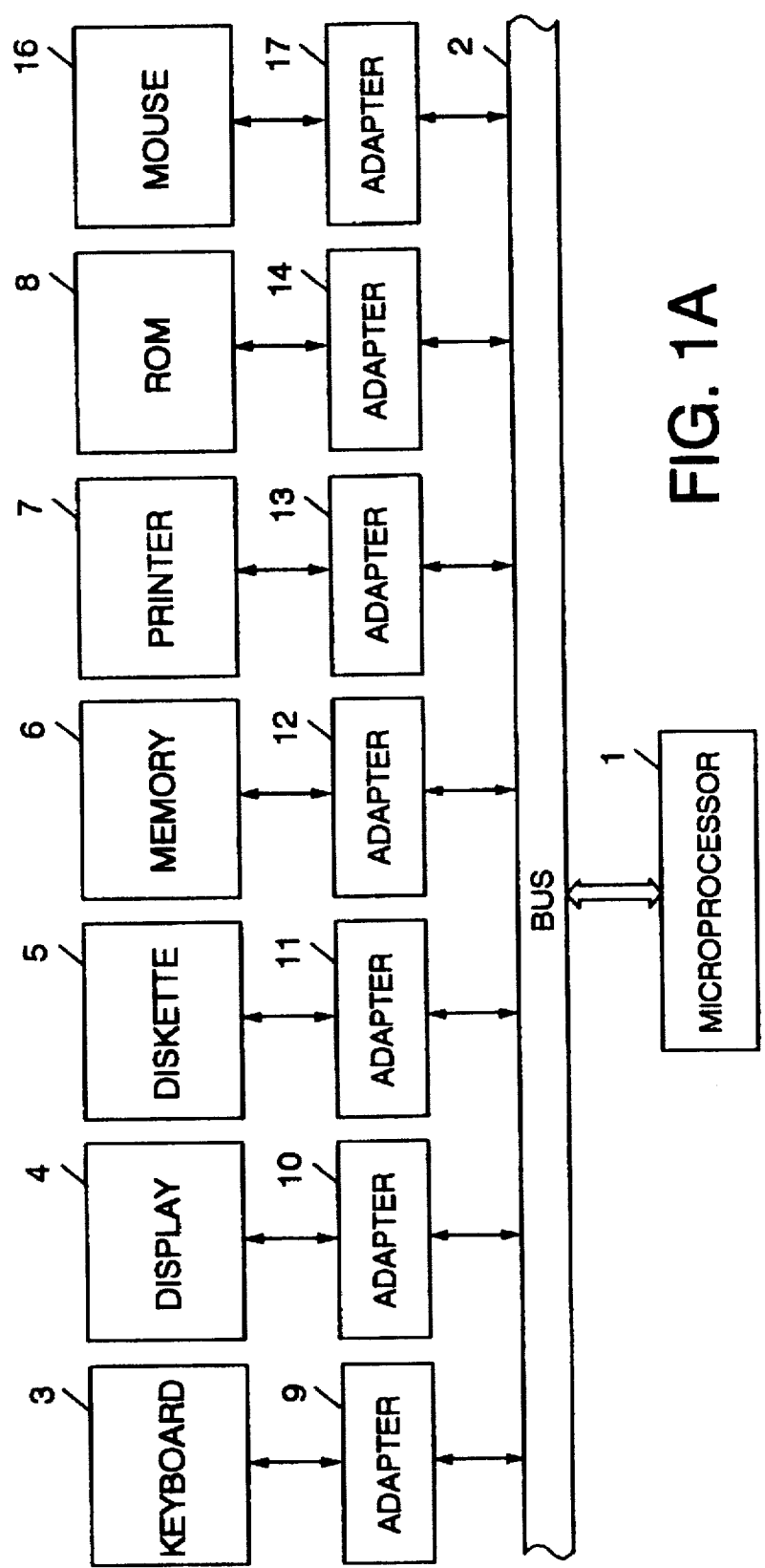
FIG. 1A is a block diagram of a data processing system which includes a stored program for performing the function of the invention in conjunction with the data processing system.

Referring now to FIG. 1A, a typical personal computer architecture is shown, such as the configuration used in the IBM Personal Computer or the IBM PS/2® computer. The present invention may also be used in other digital computer architectures, such as mini-computer and mainframe computer environments. The term "computer" means any device capable of functioning as a Turing Machine, as described in Encyclopedia of Computer Science, ISBN 0-88405-321-0, published by Petrocelli/Charter, New York, N.Y. (1976), which is specifically incorporated herein by reference in its entirety.

The focal point of the preferred personal computer architecture comprises a microprocessor 1 which may, for example, be an INTEL 8088, 386, 486, or similar microprocessor. The microprocessor 1 is connected to a bus 2 which comprises a set of data lines, a set of address lines and a set of control lines. A plurality of I/O devices or memory or storage devices 3–8 and 16 are connected to the bus 2 through separate adapters 9–14 and 17, respectively. For example, the display 4 may be the IBM Personal Computer Color Display and the adapter 10 may, accordingly, be the IBM Color/Graphics Adapter. The other devices 3 and 5–8 and adapters 9 and 11–14 are either included as part of an IBM Personal Computer or are available as plug-in options from the IBM Corporation.

The random access memory (RAM) 6 and the read-only memory (ROM) 8 and their corresponding adapters 12 and 14 are included as standard equipment in the IBM Personal Computer, although additional random access memory to supplement memory 6 may be added via a plug-in memory expansion option.

Within the read-only memory 8 are stored a plurality of instructions, known as the basic input/output operating system, or BIOS, for execution by the microprocessor 1. The BIOS controls the fundamental operations of the computer. An operating system such as the IBM Personal Computer Series Disk Operating System by Microsoft Corporation (DOS), or the IBM OS/2 operating system software by IBM Corporation, most commonly used with the IBM personal computer family, is loaded into the memory 6 and runs in conjunction with the BIOS stored in ROM 8. It will be understood by those skilled in the art that the personal computer system could be configured so that parts or all of the BIOS are stored in the memory 6 rather than in the ROM 8 so as to allow modifications to the basic system operations by changes made to the BIOS program, which would then be readily loadable into the random access memory 6. Similarly, programs stored in memory 6 may be stored in ROM 8.

An application program such as a word processing program may also be loaded into the memory 6 to provide instructions to the microprocessor 1 to enable a comprehensive set of word processing tasks, including the creation and revision of text documents, to be performed by the personal computer system shown in FIG. 1. An application program loaded into the memory 6 is said to run in conjunction with the disk operating system previously loaded into the memory 6.

When using a computer such as the IBM Personal Computer for the system shown in FIG. 1, an input device such as a mouse 16 and an adapter may, for example, comprise the MICROSOFT MOUSE. This mouse is available in either a serial version, which plugs into an Asyncronous Communications Adapter available for the IBM Personal Computer, or in a bus version which includes an adapter card which plugs into an accessory slot in the IBM Personal Computer. Mouse 16 is an input device for interacting with the personal computer. Other input devices include keyboards, tablets, touch screens, light pens, joysticks, trackballs, and similar devices.

Personal computer architecture and components are further explained in The Winn Rosch Hardware Bible, by Winn L. Rosch, ISBN 0-13-160979-3, published by Simon & Schuster, Inc., New York, N.Y. (1989), which is specifically incorporated herein by reference in its entirety.

In the preferred embodiment, as shown in FIG. 1B, a control apparatus 15 controls the dimensional appearance of a first image 18 on display 4. The way in which the first image 18 appears to a viewer may take different forms. For example, the viewer may view the first image 18 from the perspective of an external observer, that is, as if the viewer were not a part of, or outside, the displayed first image 18. In this context, it is advantageous to correlate the control 15 with the first image 18 (e.g., vehicle, building, or other object). Thus, manipulating the control 15 manipulates an object depicted by the first image 18. Alternatively, the viewer may view the first image 18 from the perspective of an internal observer, that is, as if the viewer were a part of, or inside, the displayed first image. In this context, it is advantageous to correlate the control 15 with the viewer. Thus, manipulating the control 15 manipulates the viewer within the virtual space depicted by the first image 18. Further, perspective within the virtual space can be either relative or absolute with respect to a particular frame of reference. The particular manner in which control 15 operates depends upon the form in which the first image 18 appears to a viewer.

As shown in FIG. 1B and 1C, the control 15 comprises a second image 19 associated with the first image 18 and a mechanism 20 for altering the appearance of the first image 18 in response to selecting a portion of the second image 19. As used herein, "selecting" means to indicate, choose, or otherwise identify some portion of an image displayed on a display via an input device, including, but not limited to, positioning a cursor on the image portion and "clicking" a mouse button. The second image 19 is preferably displayed on display 4 (but may be displayed on another display) and includes indicia 19a, 19b, 19c, etc., for representing multiple modes of operation. The mechanism 20 for altering the appearance of the first image 18 is preferably a stored program 20a. Alternatively, the mechanism 20 may be implemented in electronic circuitry in a manner known to those skilled in the art of information handling technology.

In the preferred embodiment, the stored program component 20a of the control 15 is a part of the presentation manager portion of an operating system, such as OS/2. Alternatively, it may be a stand-alone program (e.g., temporary and stay resident, TSR, program) or may be a part of the BIOS, other system program, or an application program. Programming for graphical user interfaces is discussed in "Open Software Foundation Programmers' Reference", ISBN 0-13-640517-7, published by Prentice-Hall, Englewood Cliffs, N.J. (1990), which is specifically incorporated herein by reference in its entirety.

While being executed by microprocessor 1, stored program 20a either directly monitors, or receives messages which indicate, whether any input device, such as mouse 16, has selected a particular indicia of the second image 19. Stored program 20a responds to the selection of a particular indicia by executing instructions associated with the selected indicia, as functionally depicted in FIG. 1C.

The design of the second image 19 component of the control 15, and associated indicia 19a, 19b, 19c, etc., will now be discussed. Design of visual controls is discussed in "Visual Design with OSF/Motif", by Shiz Kobara, ISBN 0-201-56320-7, published by Addison-Wesley, Reading Mass. (1991), which is specifically incorporated herein by reference in its entirety.

Figure 2A:
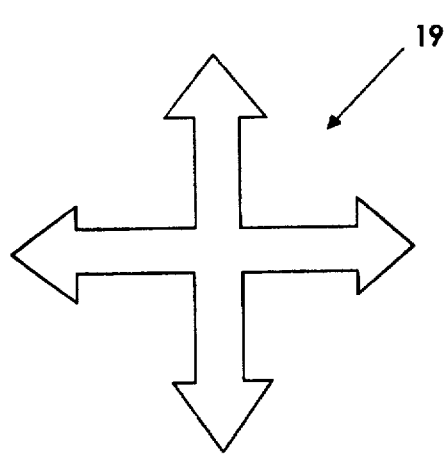
FIG. 2A and 2B are views depicting embodiments of the visual component of the control apparatus, including indicia for representing change in view and indicia for representing current view, respectively.
Figure 2B:
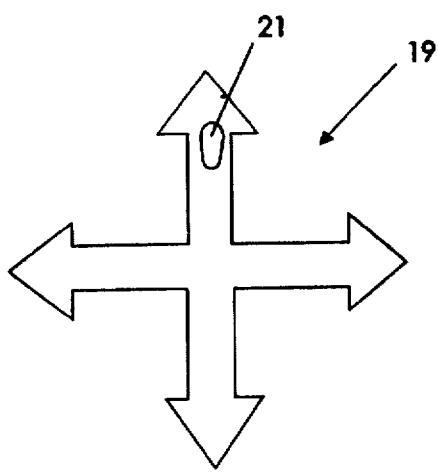
Figure 9:
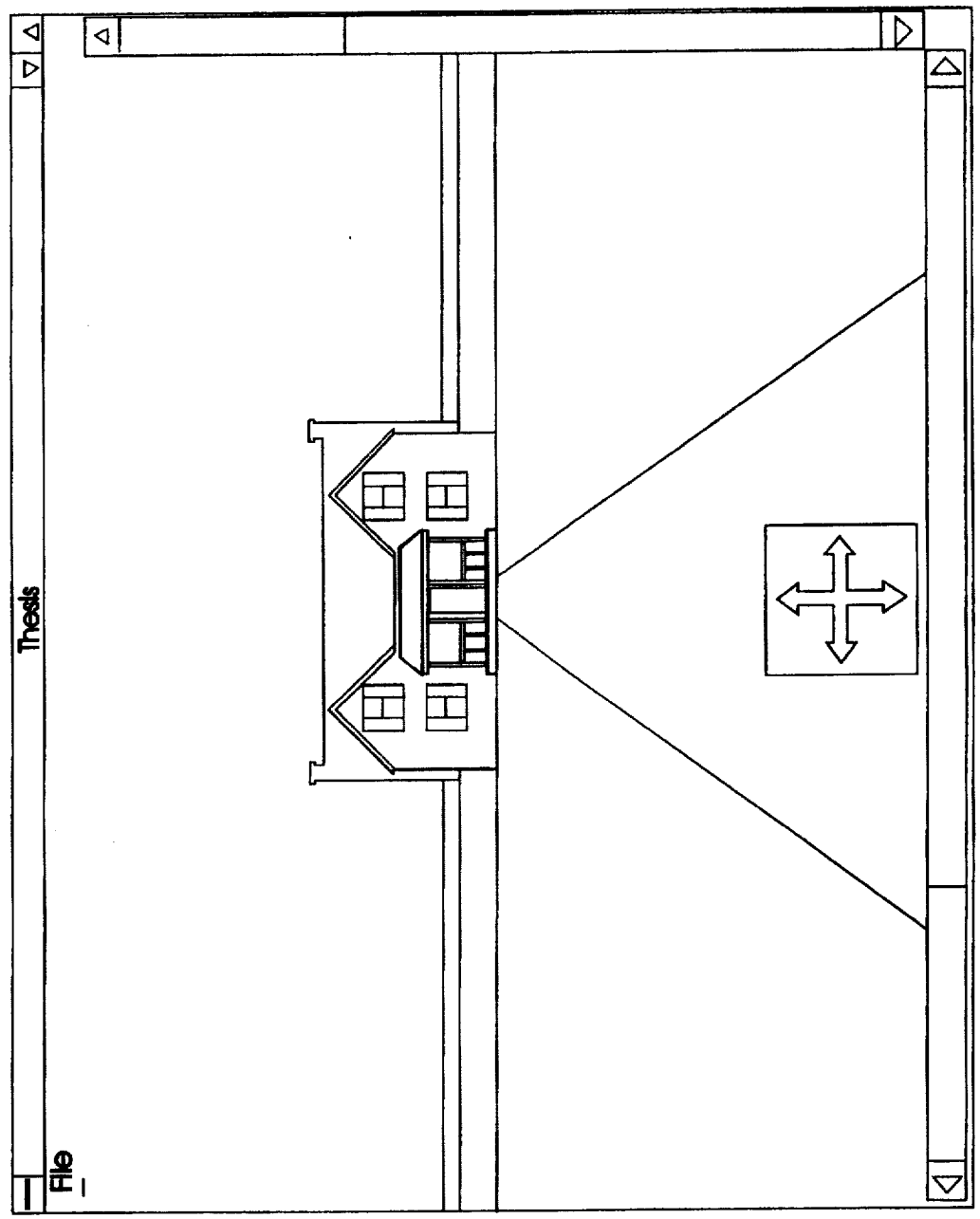
FIG. 9 is an illustration of a display screen containing a first image and a second image in accordance with the present invention.

FIG. 2A depicts an embodiment of second image 19 which includes indicia representing a view mode. Stored program 20a includes instructions for changing the view of the first image 18 in response to selection of indicia by an input device. In this particular embodiment, the control 15 represented by the second image 19 facilitates turns within a particular dimension in any of four directions. For example, positioning the cursor on a particular second image arrow and clicking mouse 16 causes the first image view or perspective to turn in that direction. To a viewer in external observer mode, this might result in changing an image depicting a front elevation of a house to a side elevation. To a viewer in internal observer mode, this might result in changing an image depicting a front facade of a house (as depicted in FIG. 9) to a vehicle parked in a driveway adjacent to the house. The current perspective viewed by the viewer may be advantageously tracked by monitoring view changes and indicating the current view by placing a position indicator 21 on the appropriate portion of the second image 19, as depicted in FIG. 2B.

Figure 3A:
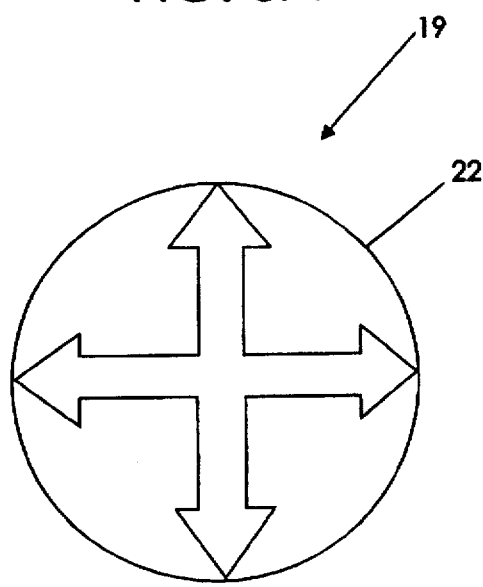
FIG. 3A and 3B are views depicting alternative embodiments of the visual component of the control apparatus, including indicia for representing incremental change in view.
Figure 3B:
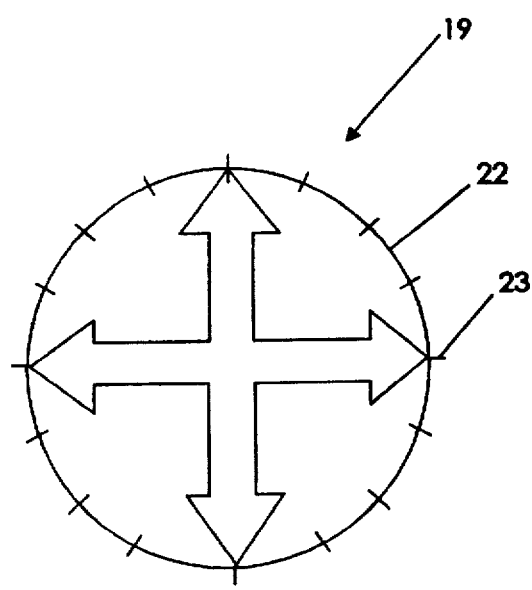

FIG. 3A and 3B depict alternative embodiments of the second image 19 which include indicia representing an incremental view change mode. In FIG. 3A, the second image 19 is enclosed within a circle 22. Selecting the edge of the circle 22 turns the perspective in that direction. Tick marks 23 may be added to the circle 22 to indicate the number of directional increments available, as shown in FIG. 3B. The scale of the tick marks may be adjusted as required for a particular application.

Figure 4A:
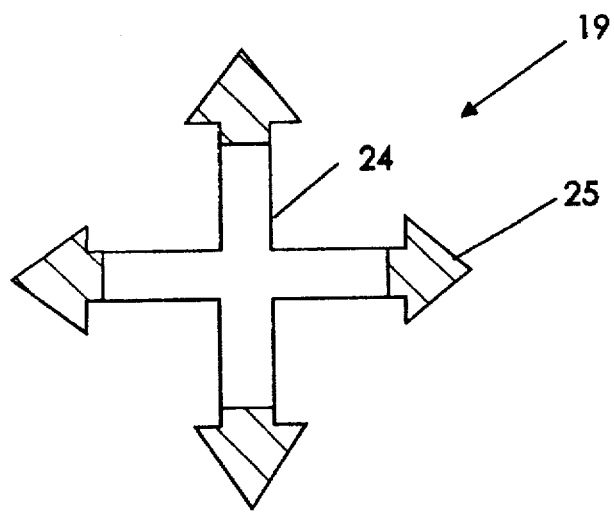
FIG. 4A and 4B are views depicting alternative embodiments of the visual component of the control apparatus, including indicia for representing movement and non-movement, and indicia for representing change in speed of movement, respectively.

Another embodiment of control 15 is depicted in FIG. 4A, wherein the second image 19 includes indicia representing movement and non-movement modes. For example, arrows shown in FIG. 4A are divided into two regions. Selecting one region 24 (shown unshaded) causes a turn. Selecting the other region 25 (shown shaded) causes a turn and causes movement in that direction. Selecting the unshaded region 24 stops movement. Indicia representing a movement mode may be further refined by including further indicia representing multiple speed zones 25a, 25b, 25c, etc., as shown in FIG. 4B (e.g., speed increases in the direction of each arrow).

Figure 4B:
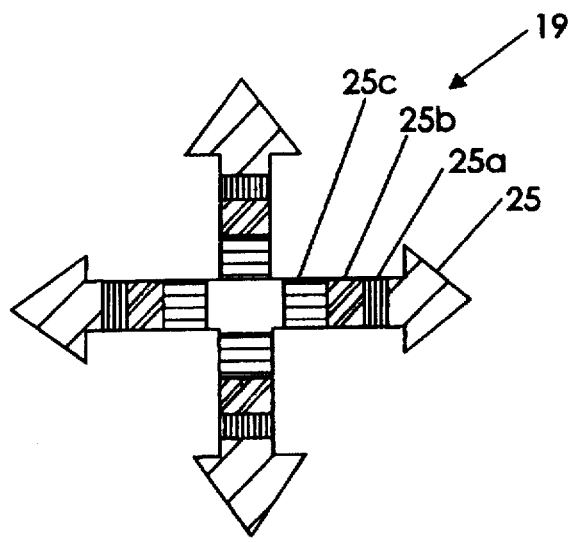
Figure 5:
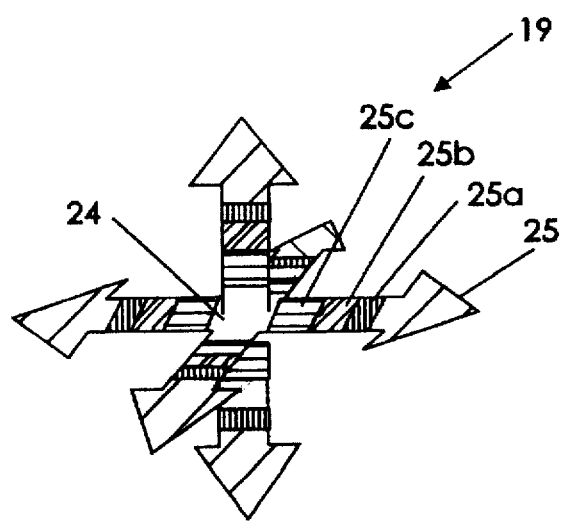
FIG. 5 is a view depicting an alternative embodiment of the visual component of the control apparatus shown in FIG. 4B, including indicia for representing an additional spatial dimension.

FIG. 5 illustrates an embodiment of the visual component of control 15 which combines indicia for representing an additional spatial dimension with the indicia illustrated in FIG. 2A and 4B. The added spatial dimension shown in FIG. 5 is a z-axis which may be used to represent height or thickness. To a viewer in external observer mode, this might facilitate changing an image depicting a front elevation of a house to a top plan view or a bottom plan view. To a viewer in internal observer mode, this might facilitate changing an image depicting a front facade of a house to a view of the sky or the ground (or, alternatively, to an ascendant or descendant view of the front facade).

When a person sees an object move through the 3D space of the real world they perceive it getting larger as it moves toward them and smaller as it recedes in the distance. In one embodiment of control 15, the stored program 20a changes the appearance of a cursor 26 which is moved within the boundaries of the second image 19 based upon the relative position of the cursor 26 within the second image. As shown in FIG. 6A and 6B, for example, the cursor 26 grows and shrinks relative to its position along the z-axis. In addition to changing the size of the cursor 26, the stored program 20a may also change the visibility of the cursor 26 from distinct to less distinct as the cursor is moved further away along the z-axis, as depicted in FIG. 6C and 6D.

Figure 7A:
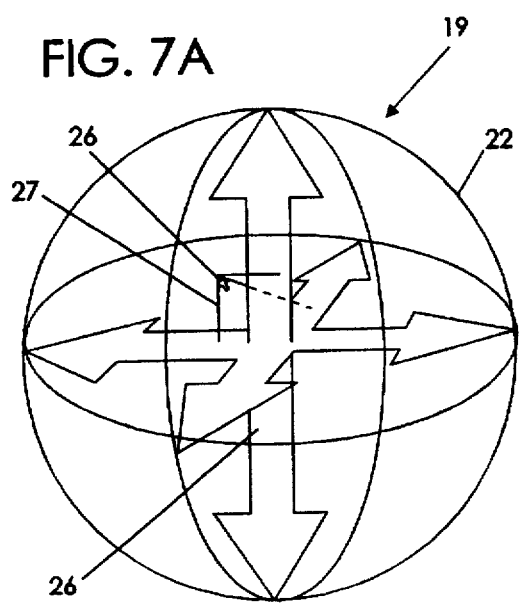
FIG. 7A, 7B, and 7C are views depicting an alternative embodiment of the visual component of the control apparatus shown in FIG. 6A, 6B, 6C, and 6D, including indicia for representing position within a 3D environment.
Figure 7B:
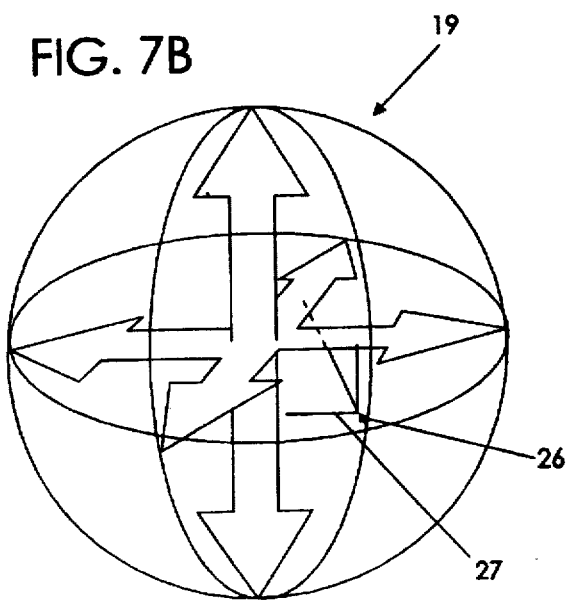
Figure 7C:
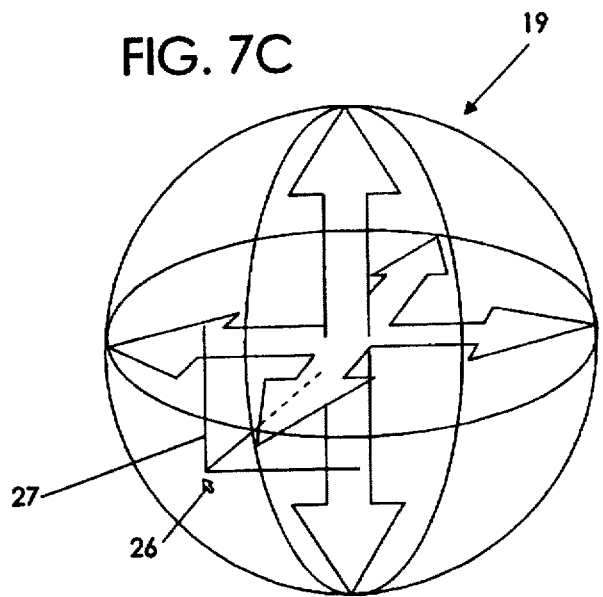
Figure 8A:
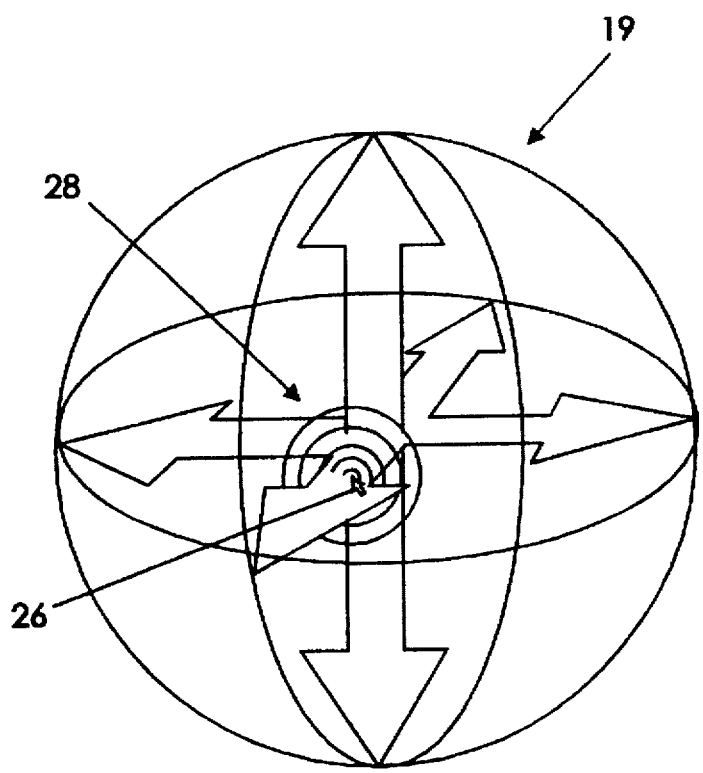
FIG. 8A and 8B are views depicting an alternative embodiment of the visual component of the control apparatus shown in FIG. 7A, including indicia for representing auditory feedback of position within a virtual environment.
Figure 8B:
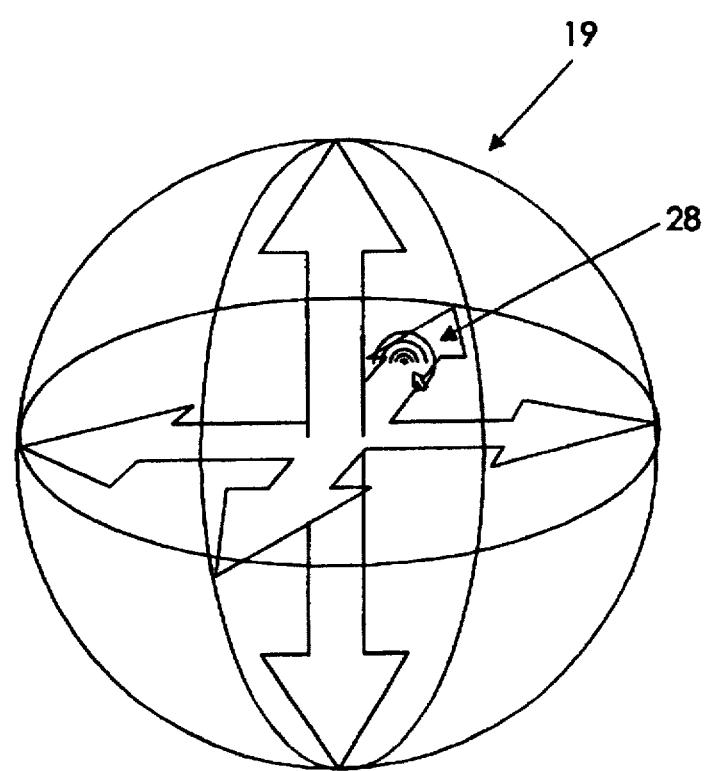

In order to identify the position of a cursor 26 within a second image 19, marks 27, such as lines, may be used to connect the cursor to the most proximate axes, as depicted in FIG. 7A, 7B, and 7C. Supplementally or alternatively, the cursor color or shape may be changed to reflect in which half of the sphere the cursor is located (e.g., red for foremost half; blue for rearmost half).

The visual component of control 15 may be combined with both sound indicia 28 and actual sound to further indicate the position of a cursor 26 within the boundaries of the second image 19. Visual cues may not always be sufficient because the screen is already cluttered with other information, the user is looking away from the screen, or the user is visually impaired. Auditory cues can provide a supplement to or a substitute for visual cues. In one embodiment of control 15, the stored program 20a executes instructions which respond in a manner similar to sound in the real world, e.g., by increasing volume in inverse relation to distance. Loud sounds denote nearness; soft sounds denote distance. Position to the left and right of the user may be indicated through the production of stereo sound. Sounds which are to the right of the user will be louder in the right ear than in the left. A slight time delay between sound reaching the right and left ears enhances this effect. Speed and direction are indicated by changes in frequency. As an object moves closer, the pitch of auditory cues increases. The faster the object moves toward the user, the higher the rate of increase in pitch. This is similar to listening to a train whistle as it approaches—the doppler effect shifts the frequency of the whistle. Sound may provide feedback on the position of the mouse cursor as the user moves it or it may indicate the position of objects created by the computer. The sound may be either continuous or generated on-the-fly when an object is moved or its position queried. The movement may be relative to either the current position or some absolute position.

An important element of control 15 is the ability to combine indicia which represent different functions into a unitary control apparatus. Thus, the indicia shown in FIG. 2B, 3A, and 3B (and associated stored program functions) may also be combined with the indicia shown in FIG. 5, albeit modified as required for 3D (e.g., sphere in lieu of a circle). Similarly the indicia shown in FIG. 5 may be combined with the indicia shown in FIG. 6A, 6B, 6C, 6D, 7A, 7B, 7C, 8A, and 8B. Each combination of two or more indicia (e.g., direction, speed, incremental or continuous movement, etc.) results in a unique modular and multi-functional control.

If a particular control function is unavailable or not applicable in a given context, the associated visual indicia may be appropriately marked to so indicate (e.g., shading or coloring the indicia in some manner). For example, upon reaching a boundary with a virtual reality, the associated arrow changes color to indicate no further movement is possible in that direction.

In operation, the method for controlling the dimensional appearance of a first image on a display device includes the steps of displaying a second image associated with the first image, wherein the second image includes indicia for representing multiple modes; and altering the appearance of the first image in response to selecting the indicia for one of the multiple modes.

Further, the invention may be embodied in a computer program product having a computer readable medium having computer program logic recorded thereon for controlling the dimensional appearance of a first image on a display device. The computer program product comprises a mechanism for displaying a second image associated with the first image, wherein the second image includes indicia for representing multiple modes; and a mechanism for altering the appearance of the first image in response to selecting the indicia for one of the multiple modes.

The invention may also be embodied in a graphical user interface system comprising at least one computer having at least one memory; at least one input device; at least one display device; mechanism, such as a bus, operably connecting the computer, memory, input device, and display device for communication therebetween; mechanism for communicating a first image and a second image stored within the memory via the bus for display on the display device, wherein the second image includes indicia for representing a plurality of modes; and stored program executable by the computer for altering the dimensional appearance of the first image in response to selecting the indicia for one of the plurality of modes.

Another embodiment of the invention is a display apparatus for controlling the dimensional appearance of a first image. The display apparatus comprises a mechanism for displaying a second image associated with the first image, wherein the second image includes indicia for representing a plurality of modes; and means within the display apparatus for altering the appearance of the first image in response to selecting the indicia for one of the plurality of modes.

Yet another embodiment of the present invention is an icon stored in a memory for use on a display device, comprising the combination of at least two of the following indicia: number of dimensions indicia; change view indicia; start movement indicia; and stop movement indicia.

Of course, many modifications and adaptations to the present invention could be made to advantage without departing from the spirit of this invention. The control is extensible to dimensions greater than three, for example. Also, the control may be adapted for use in interactive television. Further some features of the present invention could be used without corresponding use of other features. Use of indicia and associated function is modular. Indicia may be "mixed and matched" in order to configure a control suitable for e particular application. Accordingly, this description should be considered as merely illustrative of the principles of the present invention and not in limitation thereof.

We claim:

1. Apparatus for controlling the dimensional appearance of a first image on a display device, comprising:

(a) means for displaying a second image associated with said first image, wherein said second image includes indicia representing at least two spacial dimensions and said second image includes indicia for representing a plurality of modes including a plurality of speed modes; and (b) means for altering the appearance of said first image in response to:

selecting the indicia for a turn and move mode of said plurality of modes, wherein selecting the indicia for said turn and move mode alters the appearance of said first image by depicting rotation of said first image and depicting translational movement of said first image; and selecting the indicia for a speed mode alters the appearance of said first image by depicting movement of said first image in a first dimension at a particular speed.

2. Control apparatus according to claim 1, further comprising view mode indicia including indicia for representing the current view of said first image and said altering means including means for updating said current view indicia in response to changing the view of said first image.

3. Control apparatus according to claim 1, wherein said second image includes indicia representing a movement mode and said altering means includes means for depicting movement of said first image in said first dimension in response to selecting said movement mode indicia.

4. Control apparatus according to claim 3, further comprising said movement mode indicia including indicia representing a temporal movement and said altering means includes means for depicting temporal movement of said first image in response to selecting said movement mode indicia.

5. Control apparatus according to claim 1, wherein said second image includes indicia representing a stop movement mode and said altering means includes means for depicting a stopping of movement of said first image in response to selecting said stop movement mode indicia.

6. Control apparatus according to claim 1, wherein said altering means is a stored program executable by a computer.

7. Control apparatus according to claim 1, further comprising means for changing the appearance of a cursor which is moved within the boundaries of said second image based upon the relative position of said cursor within said second image.

8. Control apparatus according to claim 7, wherein said cursor changing means comprises a stored program executable by a computer which enlarges and decreases the size of said cursor relative to a frame of reference.

9. Control apparatus according to claim 7, wherein said cursor changing means comprises a stored program executable by a computer which increases and decreases the visibility of said cursor relative to a frame of reference.

10. Control apparatus according to claim 7, further comprising means for identifying the virtual position of said cursor within the boundaries of said second image based upon the relative position of said cursor within said second image.

11. Control apparatus according to claim 1, further comprising means for generating sound in association with a cursor which is virtually moved within the boundaries of said second image based upon the relative position of said cursor within said second image.

12. Control apparatus according to claim 11, wherein said cursor changing means comprises a stored program executable by a computer which increases and decreases the volume of said sound associated with said cursor relative to a frame of reference.

13. Control apparatus according to claim 11, wherein said cursor changing means comprises a stored program executable by a computer which increases and decreases the frequency of said sound associated with said cursor relative to a frame of reference.

14. A method for controlling the dimensional appearance of a first image on a display device, comprising the steps of:
 (a) displaying a second image associated with said first image, wherein said second image includes indicia representing at least two spacial dimensions and said second image includes indicia for representing a plurality of modes including a plurality of speed modes; and
 (b) altering the appearance of said first image in response to:
  selecting the indicia for a turn and move mode of said plurality of modes, wherein selecting the indicia for said turn and move mode alters the appearance of said first image by depicting rotation of said first image translational movement of said first image; and
  selecting the indicia for a speed mode alters the appearance of said first image by depicting movement of said first image in a first dimension at a particular speed.

15. A computer program product having a computer readable medium having computer program logic recorded thereon for controlling the dimensional appearance of a first image on a display device, said computer program product comprising:
 (a) means for displaying a second image associated with said first image, wherein said second image includes indicia representing at least two spacial dimensions and said second image includes indicia for representing a plurality of modes including a plurality of speed modes; and
 (b) means for altering the appearance of said first image in response to:
  selecting the indicia for a turn and move mode of said plurality of modes, wherein selecting the indicia for said turn and move mode alters the appearance of said first image by depicting rotation of said first image translational movement of said first image; and
  selecting the indicia for a speed mode alters the appearance of said first image by depicting movement of said first image in a first dimension at a particular speed.

16. A graphical user interface system, comprising:
 (a) at least one computer having at least one memory;
 (b) at least one input device;
 (c) at least one display device;
 (d) means operably connecting said computer, memory, input device, and display device for communication therebetween;
 (e) means for communicating a first image and a second image stored within said memory via said communication means for display on said display device, wherein said second image includes indicia representing at least two spacial dimensions and said second image includes indicia for representing a plurality of modes including a plurality of speed modes; and
 (f) means stored within said memory and executable by said computer for altering the appearance of said first image in response to:
  selecting the indicia for a turn and move mode of said plurality of modes, wherein selecting the indicia for said turn and move mode alters the appearance of said first image by depicting rotation of said first image and depicting translational movement of said first image; and
  selecting the indicia for a speed mode alters the appearance of said first image by depicting movement of said first image in a first dimension at a particular speed.

17. The graphical user interface of claim 16 further comprising:
 (g) means stored within said memory and executable by said computer for changing the appearance of a cursor which is moved within the boundaries of said second image based upon the relative position of said cursor within said second image.

* * * * *